United States Patent
Lee

(10) Patent No.: US 7,252,019 B2
(45) Date of Patent: Aug. 7, 2007

(54) HIGH RIGID TILT DEVICE IN A STEERING COLUMN FOR A VEHICLE

(75) Inventor: Byeong-Hoon Lee, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 600 days.

(21) Appl. No.: 10/704,736

(22) Filed: Nov. 12, 2003

(65) Prior Publication Data

US 2005/0050978 A1 Mar. 10, 2005

(30) Foreign Application Priority Data

Sep. 6, 2003 (KR) .................. 10-2003-0062326

(51) Int. Cl.
*B62G 1/16* (2006.01)

(52) U.S. Cl. .................. 74/493; 74/492; 280/775; 280/779; 248/229.21

(58) Field of Classification Search ............... 74/492, 74/493; 280/775, 779, 780; 248/229.21, 248/230.2
See application file for complete search history.

(56) References Cited

U.S. PATENT DOCUMENTS

| 4,330,139 | A | | 5/1982 | Katayama | |
|---|---|---|---|---|---|
| 4,648,624 | A | * | 3/1987 | Mouhot et al. | 280/775 |
| 4,788,880 | A | * | 12/1988 | Kester | 74/493 |
| 4,998,999 | A | * | 3/1991 | Yuzuriha et al. | 280/777 |
| 5,915,726 | A | * | 6/1999 | Hibino et al. | 280/775 |
| 6,062,101 | A | * | 5/2000 | Higashino | 74/493 |
| 6,224,104 | B1 | * | 5/2001 | Hibino | 280/777 |
| 2003/0226943 | A1 | * | 12/2003 | Laisement et al. | 248/230.2 |
| 2005/0001445 | A1 | * | 1/2005 | Ercolano et al. | 296/97.7 |

* cited by examiner

*Primary Examiner*—David M. Fenstermacher
(74) *Attorney, Agent, or Firm*—Greenblum & Bernstein, P.L.C.

(57) ABSTRACT

A tilt device is provided to allow a steering column to be tilted so that a driver can adjust the position of a steering wheel to conform to his/her figure in order to more comfortably drive a vehicle. Further, the tilt device is configured to impart a high supporting strength to the steering column while reliably locking the same.

5 Claims, 2 Drawing Sheets

[FIG. 1] PRIOR ART
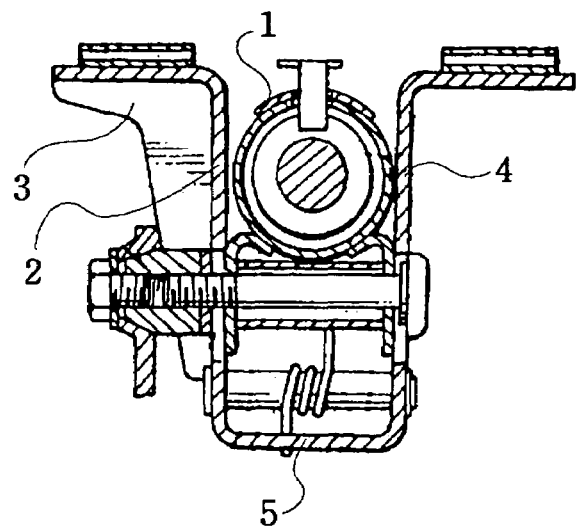
[FIG. 2]
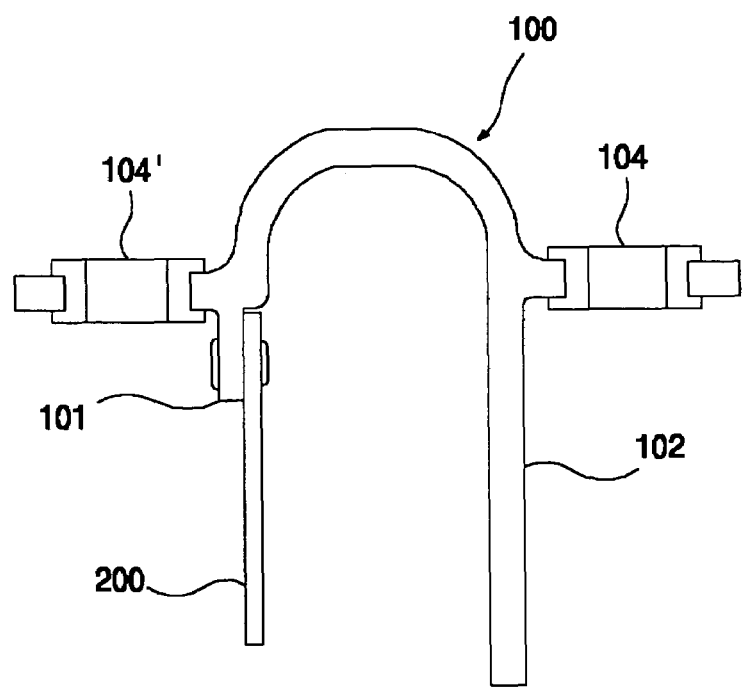

[FIG. 3]
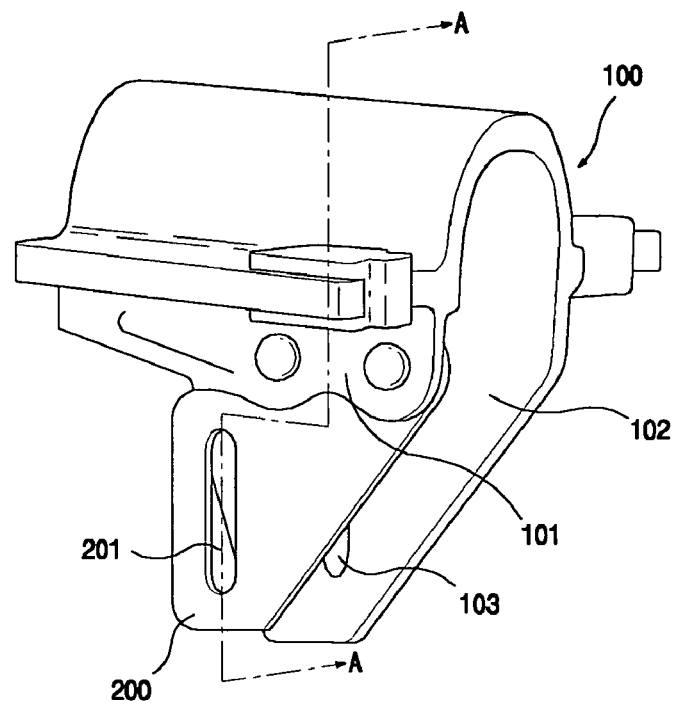
[FIG. 4]
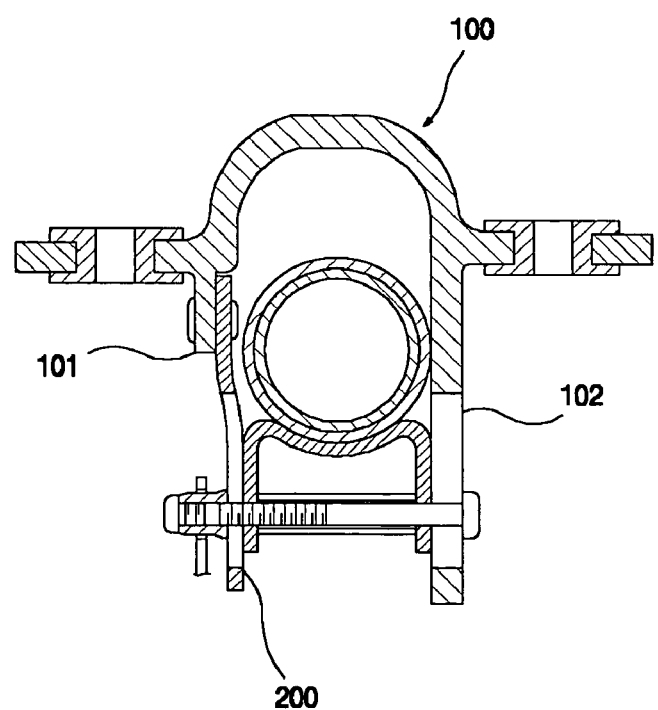

HIGH RIGID TILT DEVICE IN A STEERING COLUMN FOR A VEHICLE

The present disclosure relates to subject matter contained in priority Korean Application No. 10-2003-0062326, filed on Sep. 6, 2003, which is herein expressly incorporated by reference in its entirety.

BACKGROUND OF THE INVENTION

1. Field of the Invention

The present invention relates to a tilt device for allowing a steering column to be tilted so that a driver can adjust the position of a steering wheel to conform to his/her figure in order to more comfortably drive a vehicle.

2. Background of the Related Art

In general, a tilt device comprises a mounting bracket fixed to a vehicle body, a tilt bracket connected to the mounting bracket and having a pair of side walls with tilt slots for guiding a tilt operation, a distance bracket fixed from below to the outer periphery of a steering tube which rotatably supports a steering shaft and having a pair of side walls with through holes, and a tilt-locking mechanism arranged through the tilt slots of the tilt bracket and the through holes of the distance bracket to cause tight contact between the side walls of the tilt bracket and the side walls of the distant bracket to lock a tilt of a steering column.

A conventional tilt device of the above structure is disclosed in U.S. Pat. No. 6,062,101. The above conventional tilt device has a tilt bracket of a laterally symmetric structure. When a tilt-locking mechanism is placed in a locking position, both right and left side walls of the tilt bracket are bent inward and closely contacted respectively with right and left side walls of a distance bracket to lock the distance bracket from vertical movement so that the tilt operation of a steering column is locked.

Therefore, the above conventional structure requires that the side walls of the tilt bracket should be elastically bent. As a result, there is a problem that the steering column has a weak supporting strength, in particular, in lateral directions.

In the meantime, U.S. Pat. No. 4,330,139 discloses a tilt device as shown in FIG. 1. Referring to FIG. 1, a steering bracket 1 integrally comprises a mounting bracket and a tilt bracket, in which a left side wall 2 has a flange or reinforcing portion 3. In such a structure, the left side wall 2 is not deformed but a right side wall 4 is deformed to perform a locking operation.

However, the above structure has a problem that fabrication is not simple since the steering bracket 1 has a complicated configuration. Further, as shown in FIG. 1, rear portions of the side walls 2 and 4 of the steering bracket 1 are connected to a connecting portion 5. As a result, during locking, the right side wall 4 is not uniformly deformed across its front and rear portions thereby obstructing reliable locking.

SUMMARY OF THE INVENTION

The present invention has been made to solve the foregoing problems and it is therefore an object of the present invention to provide a tilt device which can impart a high supporting strength to a steering column while reliably locking the same.

It is another object of the invention to provide a main bracket having one side walls of a mounting bracket and a tilt bracket which are formed integral and a tilt plate of a simple configuration which is mainly deformed during locking.

It is still another object of the invention to enable the main bracket to be fabricated through casting. As the main bracket can be fabricated through casting, there are advantages that the main bracket can be precisely fabricated into a complicated configuration as well as utilize nonferrous light metal such as Magnesium (Mg) and Aluminum Al) (including alloys thereof) which are not readily pressed owing to a problem of tearing.

It is a further object of the invention to provide a main bracket which is not restricted in thickness. This may have various effects: For example, strength can be enhanced to a desired magnitude and a fabrication method may not be restricted.

It is a still further object of the invention to provide a main bracket which can be made of various materials such as Al, Mg and composite. As a result, the bracket can be reduced in weight, and a most suitable material can be used according to the environment of a vehicle.

To achieve the above objects, according to an aspect of the invention, there is provided a tilt device in a steering column for a vehicle, comprising: a main bracket fixed to a vehicle body and having a supporting portion with a first tilt slot formed thereon and a coupling section; and a tilt plate connected to the coupling section of the main bracket and having a second tilt slot formed thereon.

The tilt slots formed in the supporting portion of the main bracket and the tilt plate function to guide the tilt operation of the steering column as the tilt slots formed in a conventional tilt bracket.

In the afore described invention, the tilt device can enhance the supporting strength of the steering column via the supporting portion of the main bracket and the tilt plate can be efficiently deformed to reliably lock the tilt of the steering column.

The coupling section of the main bracket and the tilt plate can be connected in any types unless they depart from the object of the invention. For example, the main bracket and the tilt plate can be connected through any of welding, bolt fastening and riveting. Further, the main bracket and the tilt plate may be integrally formed therewith at an initial step.

BRIEF DESCRIPTION OF THE DRAWINGS

The above and other objects, features and other advantages of the present invention will be more clearly understood from the following detailed description taken in conjunction with the accompanying drawings, in which:

FIG. 1 illustrates a structure of a conventional tilt device; the invention; and FIG. 2 illustrate illustrates a sectional view of a main bracket and a tilt bracket in a first embodiment of the invention;

FIG. 3 illustrates a perspective view of the main bracket and the tilt bracket of the first embodiment of the invention: and FIG. 4 is a sectional view taken along a line A-A in FIG. 3 of the invention.

DETAILED DESCRIPTION OF THE PREFERRED EMBODIMENT

The following detailed description will present a preferred embodiment of the invention in reference to the accompanying drawings.

First of all, in a tilt device in a steering column, the present invention may use any components as long as they conform to the object of the invention except for a mounting bracket and a tilt bracket corresponding to a main bracket and a tilt plate of the present invention.

For example, other components of a conventional tilt device except for the mounting bracket and the tilt bracket can be coupled with the main bracket and the tilt plate of the invention to constitute the tilt device of the invention.

FIGS. 2 and 3 illustrate a main bracket 100 and a tilt plate 200 according to an embodiment of the invention. As shown in FIGS. 2 and 3, the main bracket 100 has a coupling portion 101 in the left to be coupled with the tilt plate 200 and a supporting portion 102 in the right. The coupling portion 101 is preferably formed short to the extent of coupling with the tilt plate 200 so that the tilt plate 200 can be readily bent inward according to the operation of a tilt locking mechanism.

Therefore, as can be seen in FIGS. 2 and 3, the supporting portion 102 of the main bracket 100 and the tilt plate 200 have tilt slots 103 and 201 which are configured substantially same as those formed in the tilt bracket of the conventional tilt device.

Preferably, the thickness of the main bracket 100 is determined to a relatively large value so as to enhance the supporting rigidity of a steering column. More preferably, the main bracket 100 is made of nonferrous light metal such as Al and Mg to reduce the weight thereof.

It is also preferable to fix the main bracket 100 to a body of a vehicle in a manner substantially same as a conventional manner for installing the mounting bracket on the body of the vehicle.

FIG. 4 illustrates the steering column tilt device comprising the main bracket 100 and the tilt plate 200 as set forth above in which the tilt operation of the steering column is locked. As shown in FIG. 4, the supporting portion 102 of the main bracket 100 strongly supports the steering column, and the tilt plate 200 is deformed to reliably lock the tilt operation.

The invention of the above constitution has the following effects.

First, the main bracket is not limited in its thickness so that the supporting strength of the steering column can be enhanced to a desired value.

Second, the tilt plate can be readily deformed during tilt locking so that the tilt operation of the steering column can be reliably locked.

Third, the main bracket mainly functions to support the steering column whereas the tilt plate mainly functions to lock the tilt of the steering column so that it is possible to adjust thickness, configuration, material and so on of the main bracket and the tilt plate in order to implement the functions thereof to the maximum extent.

Fourth, the main bracket can be fabricated through casting without restriction in thickness. As a result, the main bracket can be fabricated into precise and complicated configurations and also made of nonferrous light metal such as Mg and Al (including alloy thereof) which are not readily pressed owing to problems of tearing.

Fifth, since the main bracket is not restricted in thickness, the main bracket can be made of various materials in various fashions. In particular, the main bracket can be made of nonferrous light metal or composite to reduce its weight as well as fit desirable properties of a material to the environment of a vehicle.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A tilt device in a steering column for a vehicle, comprising:
a main bracket fixed to a vehicle body and having a supporting portion with a first tilt slot formed thereon and a coupling section;
a tilt plate connected directly to the coupling section of the main bracket and having a second tilt slot formed thereon;
wherein the thickness of the tilt plate is smaller than the thickness of the main bracket in a width direction; and
wherein the tilt plate is configured to be deformed inwardly and lock the steering column in place, in response to a tilt operation of the tilt device.

2. The tilt device in a steering column for a vehicle as set forth in claim 1, wherein the main bracket is made of nonferrous light metal.

3. The tilt device according to claim 1, wherein the tilt plate is connected to an inner surface of the coupling section.

4. The tilt device according to claim 1, wherein the supporting portion extends farther than the coupling section in a downward direction.

5. A tilt device in a steering column for a vehicle, comprising:
a main bracket fixed to a vehicle body and having a support with a first tilt slot formed thereon and a coupler, wherein the support extends farther than the coupling section in a downward direction; and
a tilt plate connected to an inner surface of the coupler of the main bracket and having a second tilt slot formed thereon, wherein the tilt plate is configured to deform inwardly, such that a tilt operation of the steering column is locked; and wherein the thickness of the tilt plate is smaller than the thickness of the main bracket in a width direction.

* * * * *